United States Patent [19]
Bond

[11] Patent Number: 4,792,110
[45] Date of Patent: Dec. 20, 1988

[54] TOOLING SUPPORT APPARATUS WITH LINEAR BOOM

[76] Inventor: Irvin D. Bond, 1027 Allen Rd., Clarkston, Mich. 48016

[21] Appl. No.: 80,420

[22] Filed: Jul. 31, 1987

[51] Int. Cl.⁴ .............................................. F16M 5/00
[52] U.S. Cl. .................... 248/651; 248/653
[58] Field of Search .............. 248/651, 652, 653, 657, 248/278, 279, 281.1, 287, 421, 588; 254/122, 124

[56] References Cited

U.S. PATENT DOCUMENTS

| | | | |
|---|---|---|---|
| 2,605,069 | 7/1952 | Gillaspy | 248/278 X |
| 2,862,689 | 12/1958 | Dalrymple et al. | 248/421 X |
| 3,828,862 | 8/1974 | Dabell et al. | 248/651 X |
| 4,032,103 | 6/1977 | Ehrichs | 248/421 |
| 4,180,251 | 12/1979 | Cushenbery | 254/122 X |
| 4,405,116 | 9/1983 | Eisenberg | 254/122 |
| 4,526,346 | 7/1985 | Galloway et al. | 254/122 |
| 4,592,526 | 6/1986 | Kobelt | 248/278 |

*Primary Examiner*—Ramon O. Ramirez
*Attorney, Agent, or Firm*—Charles W. Chandler

[57] ABSTRACT

A tooling support apparatus in which a linear tooling boom has one end adapted to support a tooling member and its opposite end connected to a scissors-lift apparatus for adjusting the height and horizontal position of the tooling boom.

6 Claims, 3 Drawing Sheets

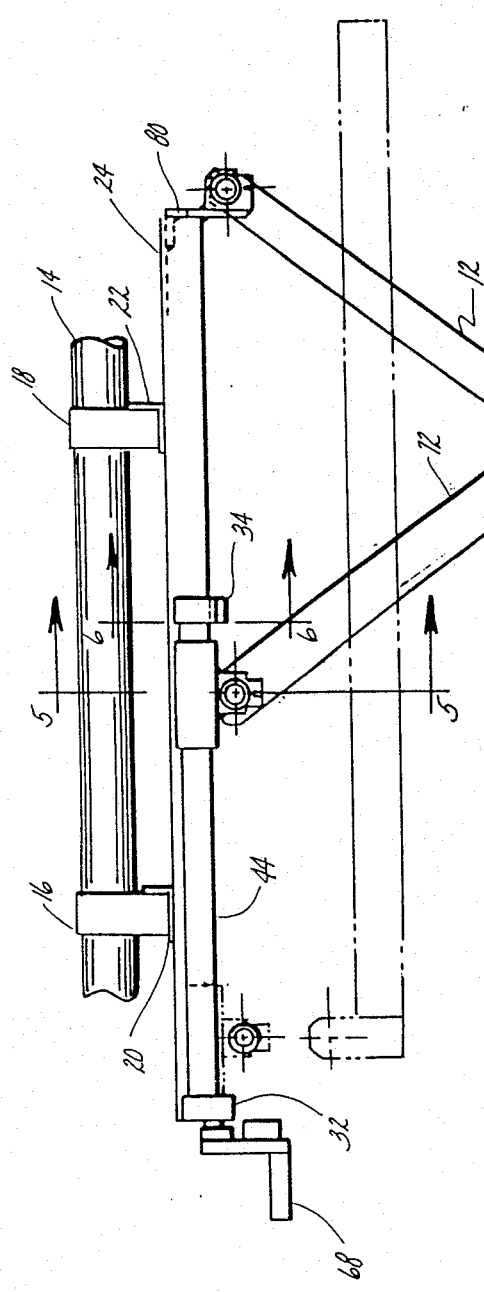
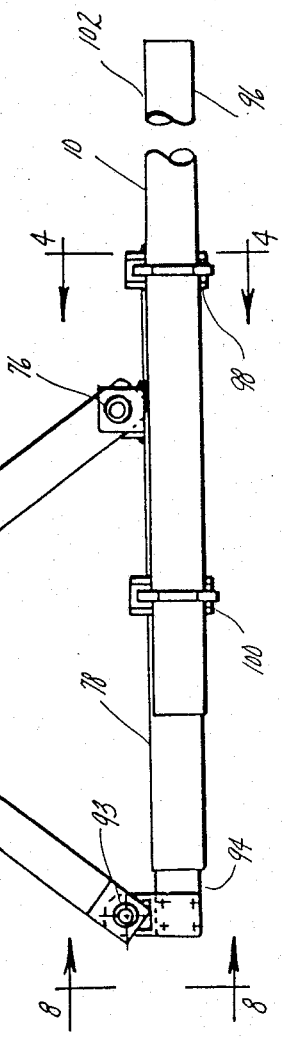
fig.1
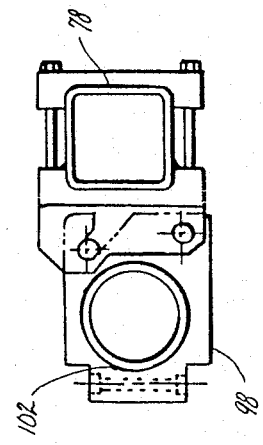
fig.4

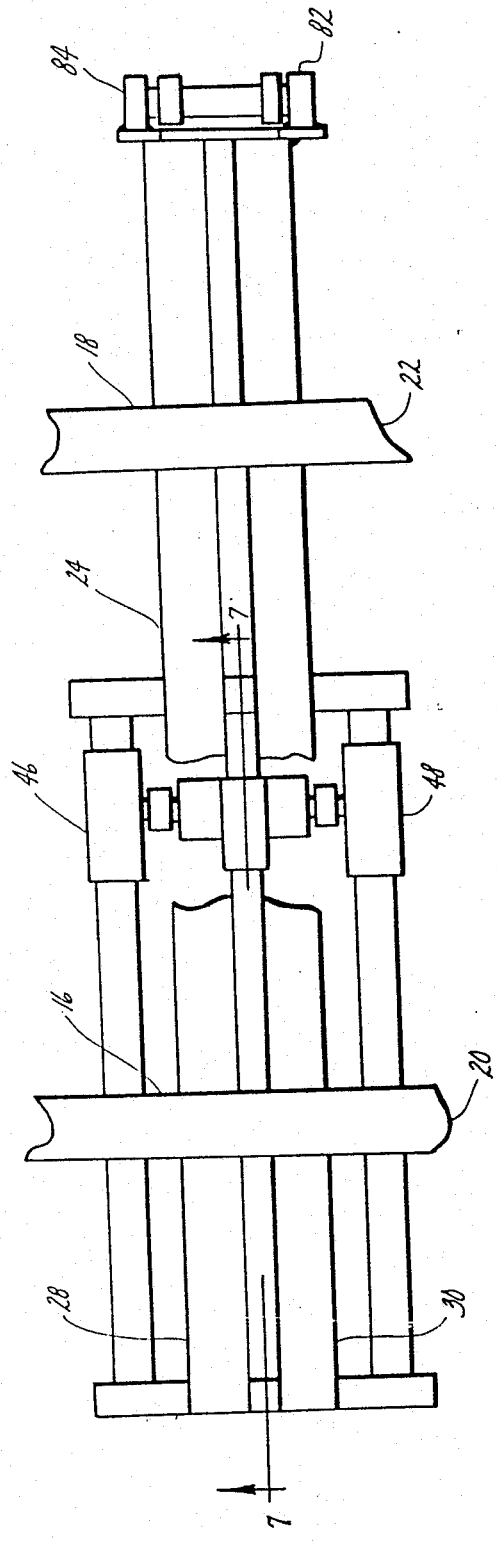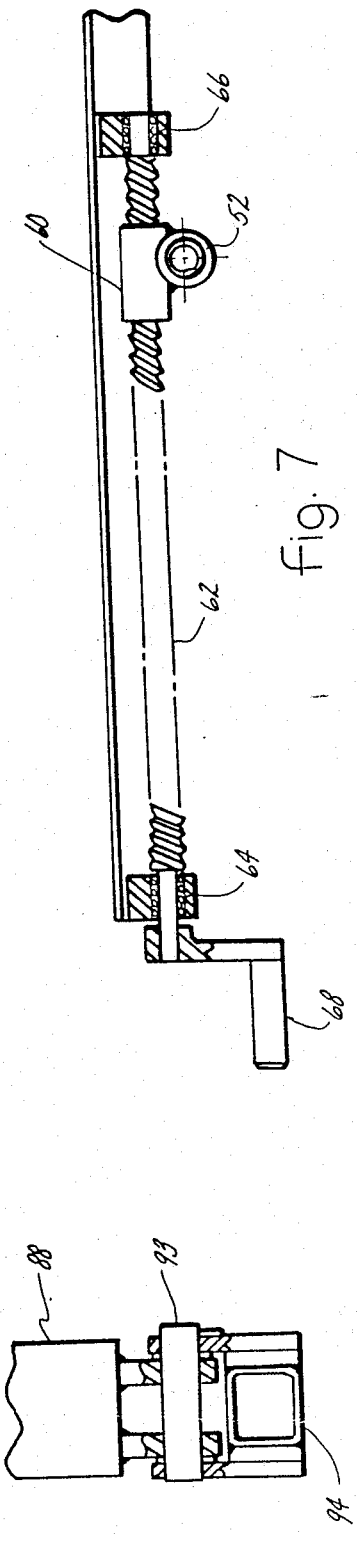

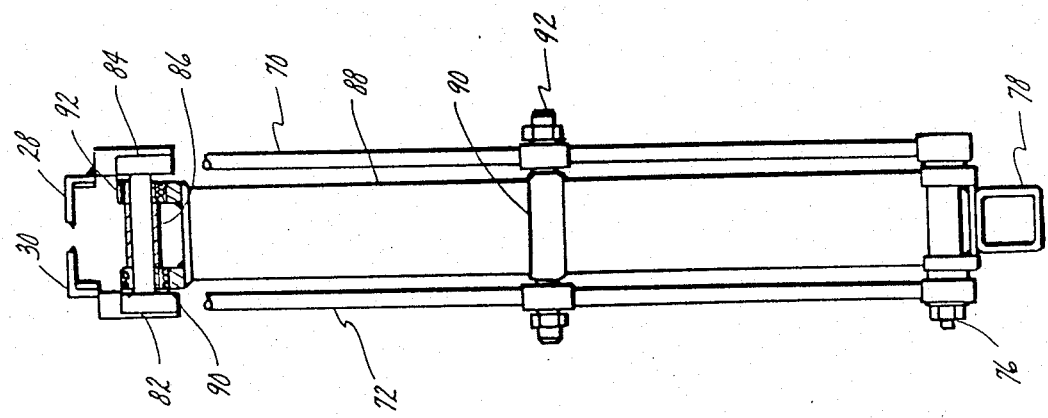

TOOLING SUPPORT APPARATUS WITH LINEAR BOOM

BACKGROUND OF THE INVENTION

This invention is related to a tooling boom having one end suspended beneath a support, and the opposite end adapted to support a tooling means such as on a production line or the like, and more particularly to a linear tooling boom, suspended from the support by a scissors-lift apparatus which permits the position of the boom to be both horizontally as well as vertically adjusted.

Tooling booms are employed on assembly lines, frequently with robotic devices, for example, for handling sheet metal parts such as fenders, hoods, deck lids and the like. The tooling booms are regularly changed to accomoodate the tooling for processing of different parts. The change-over requires considerable time removing the boom from the robot and replacing it with a different boom for a different part.

A conventional tooling boom has one end connected beneath an appropriate support and an intermediate, offset section or dog leg formed to properly locate the tooling means according to the position of the workpiece.

A problem with such an arrangement is that each tooling boom has its own unique dog leg to accommodate a particular tooling situation. Consequently a tooling boom suitable for one job is often unsuitable for another job.

Secondly, tooling booms with dog legs are difficult to store because the offset midsection increases the necessary storage space. Frequently tooling booms are employed for use in connection with robot-operated equipment. When a tooling boom is replaced by another tooling boom having a different dog leg, the robot must be reprogrammed to accommodate the difference in the location of the tooling means.

SUMMARY OF THE INVENTION

The broad purpose of the present invention is to provide an improved tooling boom apparatus in which the boom member is a linear arm, with no dog leg. The means for adjusting the boom position comprises a scissors lift mounted on the underside of the support and adapted to adjust both the height as well as the horizontal location of the tool supporting end of the boom.

The scissors-lift has a lightweight design with a narrow profile, but with a width adapted to provide stability. The horizontal adjusting components comprise a pair of telescopically arranged tubular members mounted at the lower end of the scissors arms to adjust the horizontal position of the boom. The sliding telescopic tube construction eliminates several conventional weight-producing components.

The preferred embodiment of the invention eliminates the time consumed in reprogramming robot programming means. Linear booms are easier to store because they do not have the conventional dog legs. The booms can be readily exchanged for different parts and between different robots.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an elevational view of an adjustable tool supporting boom illustrating in the preferred embodiment of the invention;

FIG. 2 is a plan view of the apparatus of FIG. 1 showing the scissors-lift separated from the overhead supporting rod;

FIG. 3 is an end view of thereof as seen from the right side of FIG. 1;

FIG. 4 is an enlarged sectional view as seen along line 4—4 of FIG. 1;

FIG. 5 is an enlarged sectional view as seen along lines 5—5 of FIG. 1;

FIG. 6 is an enlarged sectional view as seen along lines 6—6 of FIG. 1;

FIG. 7 is an enlarged view of the worm gear drive mechanism as seen along lines 7—7 of FIG. 2; and FIG. 8 is an enlarged end view as seen along lines 8—8 of FIG. 1.

DESCRIPTION OF THE PREFERRED EMBODIMENTS

Referring to the drawings, FIG. 1 illustrates a tool supporting boom 10 suspended by scissors-lift 12 beneath an overhead supporting rod 14.

Supporting rod 14 may take any convenient shape such as a frame or other suitable means mounted adjacent a robot. A scissors-lift is suspended from supporting rod 14 by a pair of bearing means 16 and 18, mounted on horizontal brackets 20 and 22, respectively. Brackets 20 and 22 are in turn attached to frame 24, illustrated in FIGS. 1 and 6, which includes a pair of parallel, spaced angle members 28 and 30.

Referring to FIG. 1 and 6, a pair of spaced brackets 32 and 34 are mounted on support members 28 and 30 by fastener means 36 and 38.

A pair of elongated hollow, tubular guide rods 42 and 44 each have one end supported by bracket 34 and their other end supported by bracket 32. Guide rods 42 and 44 are parallel and spaced with respect to one another as illustrated in FIG. 6.

A pair of bearing means 46 and 48 are slideably mounted on guide rods 42 and 44, respectively. The two bearing means 46 and 48 support a pair of cylindrical bearing members 50 and 52 respectively. An elongated tubular pivot member 54 has its ends mounted in bearing members 50 and 52. A central tubular support 56 is supported on the midsection of pivot member 54 and carries a conventional traveling nut 60.

Referring to FIGS. 5 and 7, an elongated threaded rod 62 has its ends suspended by bearing means 64 and 66 which are, in turn, mounted on angle members 28 and 30. The threaded rod is externally threaded to mesh with the internal threads of traveling nut 60. Traveling nut 60 is mounted on the threaded rod so as to move longitudinally along the threaded rod as it is rotated about its longitudinal axis. Handle 68 is fastened to the outer, narrowed end of rod 62 for rotating it.

Referring to FIG. 1, 3 and 5, a pair of scissors arms 70 and 72 have their upper ends pivotally supported by bearing means 74 and 76, respectively, on pivot member 54.

Scissors arm 70 and 72 are moved together along the threaded rod as it is being rotated, in a direction depending on the direction of rotation. The lower ends of scissors arms 70 and 72 are connected by pivot means 76 to a lower, horizontal tubular member 78. Tubular member 78 has a square cross section.

As illustrated in FIGS. 1 and 3, a horizontal support 80 is attached to the outer ends of support members 28 and 30, and has a pair of bearings 82 and 84 supporting a pivot member 86. An elongated scissors arm 88 has its upper end supported by bearings 90 and 92 on pivot member 86, between arms 70 and 72. Arm 88 has a boss 90 supporting pivot means 92 which is also pivotally connected to arms 70 and 72 so that they pivot together with respect to arm 88.

Pivot means 93 connect the lower end of arm 88 to the end of tubular member 94 which is telescopically, slideably received in tubular member 78, as best illustrated in FIGS. 1 and 8.

Thus, the upper ends of scissors arms 70 and 72 are moved longitudinally either towards or away from the upper end of arm 88 by the user rotating handle 68. As the upper ends of the scissors arms are moved toward one another, their lower ends are moved downwardly, away from support members 28 and 30. Similarly, as the handle is rotated in the opposite direction, the lower ends of the scissors arms are raised, as they are moved away from one another.

As the lower ends of the scissors members are moved away from one another, the two tubular members 78 and 94 are slideably extended, and as the handle is moved in the opposite direction, tubular member 94 is slideably received within tubular member 78 thus reducing their collective length.

One end of an elongated, linear, tubular boom 96 is connected by a pair of releasable, clamping means 98 and 100 to tubular member 78, as illustrated in FIGS. 1 and 4.

The opposite, outer end 102 of the boom is adapted to receive tooling means in the manner well known to those skilled in the art. The boom can be quickly and easily removed and exchanged with another boom.

Thus it is to be understood that I have described an improved tooling support apparatus comprising a linear boom mounted beneath an appropriate support by a scissors-lift device which providse both horizontal and vertical adjustment of the position of the boom.

Having described my invention, I claim:

1. Tooling support apparatus, comprising:
   a support;
   an elongated tooling boom having a first end and an opposite second end, the first end being adapted to support tooling means;
   structure connecting the second end of the boom to the support for adjusting the distance between the support and the boom to relocate the position of the tooling means, said structure comprising:
   a first scissors arm having an upper end and a lower end;
   a second scissors arm having an upper end and a lower end;
   a first pivot means pivotally connecting the upper end of the first scissors arm to the support;
   second pivot means pivotally connecting the lower end of the first scissors arm to the boom;
   third pivot means connecting the upper end of the second scissors arm to the support;
   fourth pivot means connecting the lower end of the second scissors arm to the boom;
   fifth pivot means connecting the first scissors arm to the second scissors arm; and
   first means for moving the first scissors arm and the second scissors arm with respect to one another so as to move the lower ends of the first scissors arm and the second scissors arm with respect to the support,
   whereby the boom is raised or lowered depending upon the motion of the upper end of the first scissors arm with respect to the upper end of the second scissors arm.

2. A combination as defined in claim 1, including a threaded rod mounted on the support, an internally threaded member mounted on the threaded rod so as to be moveable therealong as the threaded rod is being rotated about its longitudinal axis;
   a handle connected to the threaded rod for rotating it; and
   means connecting the upper end of one of the scissors arms to the internally threaded members for moving it as the handle is being rotated.

3. A combination as defined in claim 1, in which the structure comprises a first tubular member connected to the lower end of one of the scissors arms;
   a second tubular member connected to the lower end of the second scissors arm, the second tubular member being telescopically received in the first tubular member so as to be moveable therealong as the first scissors arm is being moved with respect to the second scissors arm; and
   means for connecting the boom to one of said tubular means such that the boom is moveable in a horizontal direction as the first scissors arm is being moved with respect 4. A combination as defined in claim 1, in which the tooling boom is a linear member along its full length.

5. Tooling support apparatus, comprising:
   an upper support;
   a lower support;
   scissors means connecting the upper support and the lower support, such that the lower support may be raised toward or lowered from the upper support as the scissors means is being moved;
   an elongated threaded member mounted on the upper support;
   a nut mounted on the threaded member so as to be moveable therealong as the threaded member is being rotated about its longitudinal axis, either in a first rotational direction to increase the distance between the lower support and the upper support, or in the opposite, second rotational direction to reduce the distance between the lower support and the upper support;
   means connecting the scissors means to be the nut for moving the scissors means as the threaded member is being rotated;
   an elongated tooling boom having a first end and a second end, the second end being adapted to support tooling means; and
   means for adjusting connecting the first end of the tooling boom to the lower support so as to adjust the horizontal distance between the upper support and the second end of the tooling boom;
   whereby the tooling boom is suspended beneath the upper support, and the distance between the tooling boom and the upper support depends upon the location of the nut on the threaded member.

6. Tooling support apparatus as defined in claim 5, including a handle connected to the threaded member for rotating same.

* * * * *